May 21, 1968     E. SCHULZE ET AL     3,384,235
METHOD OF AND APPARATUS FOR THE CONTINUOUS EXAMINATION
OF A TRAIN OF GLASS ARTICLES
Filed Dec. 16, 1965     6 Sheets-Sheet 1

INVENTORS
ERNST SCHULZE
GUSTAV BECKER
FRIEDHELM SEHRT
BY
Karl G. Ross
ATTORNEY

May 21, 1968  E. SCHULZE ET AL  3,384,235
METHOD OF AND APPARATUS FOR THE CONTINUOUS EXAMINATION
OF A TRAIN OF GLASS ARTICLES
Filed Dec. 16, 1965  6 Sheets-Sheet 4

INVENTORS
ERNST SCHULZE
GUSTAV BECKER
FRIEDHELM SEHRT
BY
Karl J. Ross
ATTORNEY

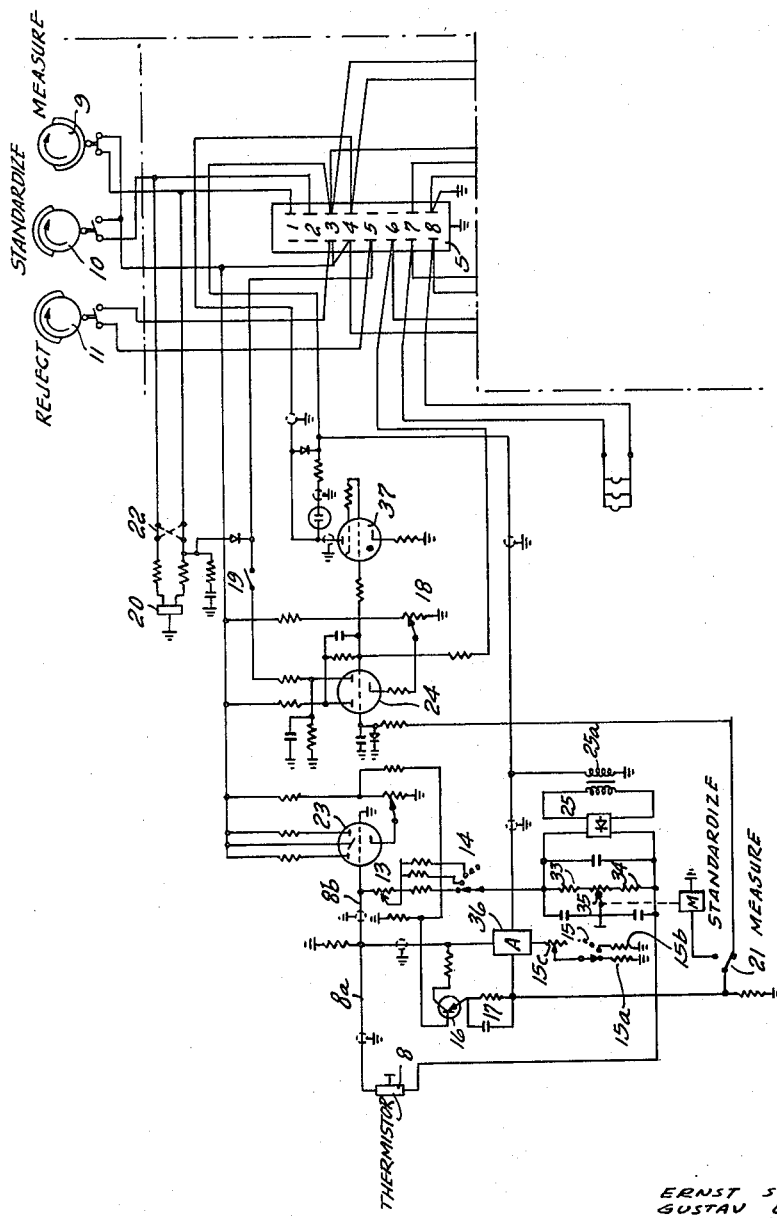

United States Patent Office 3,384,235
Patented May 21, 1968

3,384,235
METHOD OF AND APPARATUS FOR THE CONTINUOUS EXAMINATION OF A TRAIN OF GLASS ARTICLES
Ernst Schulze, Harsewinkel 14, Gladbeck, Germany; Gustav Becker, Am Bockler Baum 21, Essen-Kray, Germany; and Friedhelm Sehrt, Eduardstrasse 11, Essen, Germany
Filed Dec. 16, 1965, Ser. No. 524,660
Claims priority, application Germany, Dec. 17, 1964, St 23,098
12 Claims. (Cl. 209—73)

ABSTRACT OF THE DISCLOSURE

Method of and apparatus for the sorting of individual glass articles having vertical axes in which the articles are successively positioned upon a turntable having angularly spaced measuring stations formed by platforms rotatable about corresponding vertical axes while the measuring means includes a source of radiation insertable in the article by vertical movement, the platforms being lowerable upon rotation of the turntable to form a cup for the article; sorting means are provided downstream of the turntable for selectively shifting the articles to one or another path in accordance with the measurement.

---

Our present invention relates to a method of and an apparatus for the continuous examination of a succession of glass articles and, more particularly, the detection of light-deflecting or electromagnetic-radiation-responsive flaws and for the measurement of the wall thicknesses of hollow glass articles, especially bottles, jars, vases and other axially symmetrical glass containers.

In the glass-container industry, frequent efforts have been made to provide systems for the rapid detection of the wall thickness of a glass article and/or the presence of flaws, such as air bubbles, cracks and fissures, along the production line. In practice, however, it has been found that the only effective method heretofore of examining the wall thickness of an article to determine whether or not the glass-molding or glass-blowing machine is operating properly and the articles maintain a predetermined standard, has involved the removal of the receptacle from the production line and the measuring of its wall thickness with the aid of calipers or other mechanical thickness-measuring gauges. This process is accompanied by a further examination of the article to determine whether it is of satisfactory clarity, uniform coloration and free from air bubbles and other flaws. It is evident that this testing method is unsatisfactory because it is time-consuming and dependent upon the subjective views of the tester and, especially when large production runs are involved, the time-consuming nature of the testing operation requires that it be carried out as a sampling technique rather than with all of the articles. In fact, the use of calipers is only satisfactory when a wide-mouth receptable is involved since narrow-mouth containers, such as soft-drink, beer and liquor bottles cannot accommodate the calipers and cannot be measured thereby except at their mouths. In such cases, it has been necessary heretofore to cut samples apart and then measure the wall thickness of the separation with calipers, as described above.

In general, therefore, it must be stated that until now there has been no effective detection system proposed which is capable of processing, along the manufacturing line between the container-manufacturing apparatus and the packaging station, a continuous stream of the articles at the high rates necessary for satisfactory results and in such manner that the wall thickness and/or presence of flaws in the articles can be accurately determined.

It is, consequently, the principal object of the present invention to provide an improved method of and appartus for the high-rate continuous examination of a succession of glass articles for the evaluation of their wall thickness and/or the presence of defects.

A further object of this invention is to provide a system which can be fed by the production line of a glass-container manufacturing plant for the successive, non-destructive examination of axially extending glass articles over substantially their entire axial length and their peripheral extent without materially reducing the rate of advance of the articles along the production line.

Another object of this invention is to provide an improved method of operating a testing station for the measuring of the wall thicknesses of a succession of glass articles and the detection of flaws therein at a rate comparable to that at which the articles are produced.

We have found that these objects and others which will become apparent hereinafter are attained through the use of a testing station which comprises a turntable onto which the glass articles are successively fed in an upright condition and which is provided with a plurality of angularly spaced support platforms individual to the glass articles successively placed upon the turntable and shiftable in a direction parallel to the axis of rotation of the turntable and of each platform, the latter being rotatable on the turntable and independent of the rotation thereof. According to an essential feature of the present invention, each of the platforms is disposed at a testing station on the turntable whereby the article carried by the respective platform is juxtaposed with a detection device or measuring head which sweeps the entire periphery of the article while the latter is lowered into a cup-shaped seat and thus positively held while being rotated with respect to the measuring head.

According to a more specific feature of this invention the sorting and testing apparatus includes a transport path extending generally tangentially to the turntable and cooperating with input means at a rearward location along this path adjacent the turntable for positively feeding the individual glass articles onto the latter and the respective platforms, output means at a forward or downstream location along the path and adjacent the turntable for removing the articles from their platforms after measuring, and means responsive to the measuring heads for separating articles differing from a predetermined norm in excess of a predetermined tolerance from the balance of the articles and diverting them along different paths in accordance with the measuring operation. The last-mentioned or "reject" means can thus be responsive to the wall thickness of the articles and/or the presence or absence of radiation-detectable flaws and/or the uniformity or non-unformity of the mouth of the receptacle constituting the article. In accordance with this aspect of the invention, we provide standardization means including a speciment of glass whose wall thickness established the predetermined norm at a location along the path of the measuring head and means for displacing the measuring head into alignment with this specimen during each measuring cycle and between measurements of successive articles upon each platform. The measuring circuit is then constituted as a bridge provided with balancing means for establishing automatically the "null" or balanced condition of the bridge when the measuring head is aligned with this standardization specimen, while any unbalancing of the bridge produces an output which is fed to an amplifier and a triggerable device, the latter being energized upon this output exceeding a threshold value indicative of the limiting dimensional tolerance beyond which the article must be rejected. The circuitry also includes, in accordance with this aspect of the invention, a switch whose operation is controlled by the position of the turntable and effective in a triggered condition of this device for operating the ejector means to reject a particular article, as well as further switches controlled by the rotation of the turntable for initiating the "measuring" and the "standardization" periods of operation as the platforms swing around the path defined by the turntable.

As previously mentioned, it is an important feature of this invention that, after the individual glass articles are deposited upon the respective platforms and the turntable is rotated, the platforms will be lowered so as to constitute cupshaped receptacles for the respective article which is thus substantially immobilized and positively located with respect to the measuring head cooperating with each article. The measuring head is preferably constituted as an inverted-U slide, one arm of which (preferably the arm entering the hollow article generally axially) is formed with a radiator or emitter of a radiation which is affected by the presence or absence of flaws in the glass article and/or the wall thickness thereof. The other arm of the U is provided with a radiation detector connected in the aforedescribed bridge circuit and effective to respond to the received radiation as effected by the flaws or wall thickness. We have found that it is highly advantageous to carry out the measuring operation by more or less rapidly lowering the measuring head to its maximum insertion into the article and then withdrawing it slowly during high speed rotation of the article. For this purpose, means is provided below the turntable for rotating the respective platforms and such means can include a flexible drive element engageable with drive wheels of the respective platforms over a limited arc of rotation of the turntable corresponding to the measuring cycle. As the platform approaches the output means, it is raised again to the level of the surface of the turntable so that it can be readily engaged by an output wheel (of cruciform or star configuration) for disposition upon the conveyor forming the transport path of the articles. Advantageously, the measuring heads remain in their lowest position during at least one complete rotation of the respective article so that the evaluation of transition zone between the bottom of the article and its walls is completely carried out. By alternating between a measuring cycle and a standardization cycle for each of the articles to be tested, errors resulting from ambient influences or the like can be substantially completely eliminated.

The foregoing and other objects, features and advantages of the present invention will become more readily apparent from the following description, reference being made to the accompanying drawing, in which FIG. 1 is a plan view, partly broken away, of a testing apparatus in accordance with the present invention;

FIGS. 5a and 5b is a circuit diagram of a control system in accordance with the present invention.

*General description*

Figure 1:
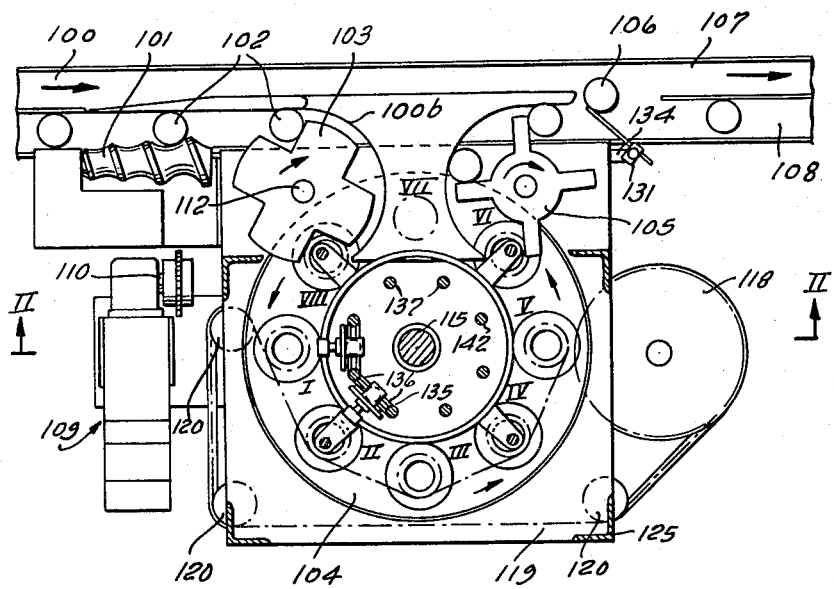
Figure 2:
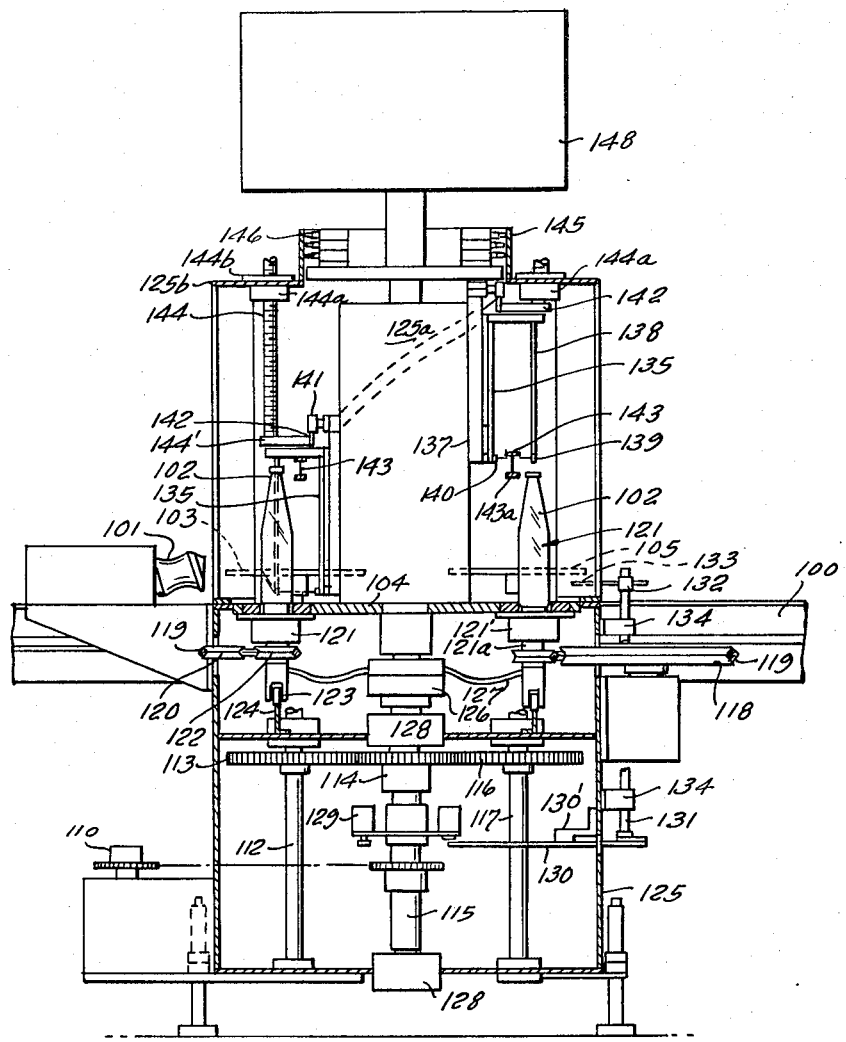
FIG. 2 is a cross-sectional view taken generally in the line II—II of FIG. 1.

Referring first to FIGS. 1 and 2, it can be seen that a turntable 104 is mounted on a shaft 115 for rotation about a vertical axis in a horizontal position of the turntable upon a support or housing 125. Shaft 115 is journaled in the bearings 128 of the housing 125 which completely encloses its drive mechanism below the turntable. The turntable 104 carries a plurality of angularly spaced testing stations 121 forming cups for the respective glass articles via platforms 121'. The latter are mounted on shafts 121a carrying the driven pulleys 122. A belt drive 118 engages these pulleys for rotating same independently of the rotation of the turntable and includes a belt 119 passing around idler pulleys 120 (FIG. 1) journaled in the housing 125. The belt 119 engages the pulleys 122 as it passes along the arc swept thereby.

The platform 121 is mounted for vertical movement on the table 104, i.e. for displacement parallel to the axis of rotation of this turntable and its own axis of rotation. The platforms 121 are thus carried by their rollers 123 at their lower extremities, the rollers resting against a curved track 124 which is a cam controlling the vertical displacement of the platforms 121. The bottoms of the platforms 121 are provided with apertures by means of which the glass containers 102 are held by vacuum against movement on the respective platform. For this purpose, the shaft 121a of each platform 121 is hollow and communicates with the openings at the platform surface and with respective flexible tubes 127 which are commonly connected with a distributor 126 on the hollow shaft 115 which serves as a duct for connecting the assembly to a reduced-pressure source such as a suction pump. The vacuum applied through the hollow shaft 115, distributor 126 and tubes 127 serves to prevent movement of the glass articles during the platform-lowering operation.

The apparatus further comprises a controllable drive 109 (FIG. 1) connected by transmission chains with a distributing shaft 110 (FIG. 2) which, in turn, operates, via a pair of conical pulses 111, the shaft 112 of an input means generally designated 103. The shaft 112 is further provided with a gear 113 which meshes the gear 114 of main drive shaft 115 carrying the turntable 104. A further gear 116 operates the shaft 117 which carries the means for positively removing the articles from the turntable as will be described in greater detail hereinafter. Ejectors 129 are provided on the main shaft 115 for activating a sorting station for removing defective articles from the normal transport path. The sorting station comprises a rod 130 which is fulcrumed at 130' on the housing 125 and is in the path of the ejectors 129 and is swingable to rotate a vertical shaft 131 pivotally mounted in the bearings 134 of the housing and carrying at 132 an arm 131 adapted to sweep across the transport path 108 upon the release of glass articles to deflect them onto a different transport path 107.

*The measuring means*

The eight measuring heads 140 and their respective radiation sources 139 are carried by a respective slide 135 individual to the respective measuring station of the turntable. The slides 135 are each guided on support post 125a via respective columns 137 by way of rollers 136 which run along these columns as rails. At the upper end of each slide 135 we provide a further roller 141 which rests upon a camming ram 142 cantilevered on vertical supports 144 from the top 125b of the support housing 125. The cam 142 thus controls the vertical movement of each slide 135 and, as the turntable 104 rotates, brings the respective measuring head into motion so that this measuring head axially sweeps the individual articles 102 as the latter moves progressively with the turntable.

In FIG. 2 we show a left-hand measuring head 140 and its slide 135 in its lowermost position while the right-hand slide and measuring head is raised to its uppermost position. The measuring assemblies 139, 104, 135 etc. are of inverted U-shaped configuration with one of the shanks of the U forming the slide 135 and the other shank constituted as a vertically extending rod 138 whose length is at least equal to that of the glass article to be examined. At the lower end of the slide 135, the detector 140 for the radiation is provided whereas, on the other shank 138, a source of electromagnetic radiation is disposed. Advantageously, the source 139 is an emitter of thermal energy (e.g. an infrared radiator such as a heating rod or element) while the detector 140 includes a convex mirror or other reflecting surface which directs the transmitted thermal radiation to a detector 8 (FIG. 5) of high thermal sensitivity. A concave mirror arrangement of the type suitable for use in the measuring head 140 is shown in the commonly assigned copending application Ser. No. 481,179, filed Aug. 20, 1965 by two of the present joint inventors and entitled "Method of and Apparatus for Detecting Light-Deflecting Flaws in Hollow Glass Articles. It will be understood, however, that although infrared radiation is here preferred for thickness and flaw detection in the transradiation of glass articles other forms of electromagnetic radiation, such as X-rays, radioactive radiation, visible-light rays or the like may be used on some occasions.

According to an important feature of this invention, each of the stations is provided with a respective standardization position of the measuring head in which, for example, the beam of electromagnetic radiation traverses a standardizing layer of glass with the desired thickness while the sensing means responsive to the thickness of the glass and the presence of flaws therein is designed to operate the ejection mechanism upon the detection of a substantial deviation from the norm established by a standardizing specimen. In the system of FIGS. 1 and 2, a standardizing specimen 143 is disposed slightly above the mouth of the article 102 at each station and athwart the radiation beam (right-hand side of FIG. 2) in the upper portion of the measuring head. Thus, as soon as the measuring head is raised above the article 102, it automatically acts upon the standardization specimen.

The columns 144 by means of which the cam rail 142 is supported, are rotatably mounted at 144' in the brackets 144" to which the rail 142 is affixed and are threaded into nuts 144a whose shoulders 144b are manually rotatable and rest against the cover plate 125b of the housing 125. By rotation of the nuts 144a, therefore, the rail 142 can be raised or lowered to adjust this rail to the height of the articles 102 to be evaluated. The main shaft 115 of the turntable 104 also carries the central post 125a mentioned earlier, which is hollow and together with chamber 148 receives the eight amplifiers and electronic switches associated with the measuring heads 140 and which are connected electrically with the respective ejectors 129. At least three switches (9, 10, 11 in FIG. 5), here generally inducted at 145, are provided for operating each of the heads 140 under the control of a cam 146 against which the switches bear. Each measuring head 140 has its own amplifier and is completely independent of the others while the heads have in common only their source of energization.

The input side of the turntable is provided, as previously mentioned, with a mechanism for successively mounting the articles 102 upon the turntable 104. For this purpose, the transport path 100 has a branch 100a extending between the container-manufacturing machine and a packing station and is provided with a synchronizing worm 101 driven at the rate of advance of the turntable 104 and successively engageable with the bottles 102 for establishing a predetermined spacing between them as they are fed by the transport band 100 to the input cruciform star wheel 103 which is rotated synchronously in a sense opposite that of the turntable. The articles 102 are thus carried along a guide 100b by the star wheel 103 onto the platform 121 of the turntable 104. As soon as the article is carried out of the reach of the arms of the star wheel 103, suction is applied and each of the platforms sinks to form the respective pocket with a respective ring 121b as seen at the righthand side of FIG. 2. The platforms 121 are set immediately in motion by the belt drive 118, 119, 122. As the articles 102 are rotated, the measuring assemblies 135–140 are lowered into the article 102 in the measuring region represented between stations I of FIG. 1. The measuring operation continues until the pocket of the turntable 104 containing the articles 102 swing from the position indicated at I to the position indicated at V, the article 102 being rotated upon the respective platform 121' during this movement. As soon as the article 102 and its platform 121' reach position V, the measuring head is raised and withdrawn from the article while the platform 121 is elevated to align its upper surface with the surface of the platform 104. At position VI, the article is removed from the turntable 104 by a cruciform star wheel 105 whose shaft 117 is positively driven via a gear coupling 114, 116 by the turntable as previously described. The output means 105 etc. deposits the article 102 upon the transport conveyor 100 which, in the region of the output, is subdivided into the transport path 108 for the satisfactory articles and the transport path 107 for the rejects. When an imperfect article is placed in the position illustrated at 106 (FIG. 1), the the corresponding ejector 129 operates the lever 133 to shift this article into the reject path 107 for further processing (e.g., return to the glass vat). Between the positions VI and VIII the measuring heads are withdrawn from their articles 102 and are in standardization position in which the specimen 143, in its frame 143a (FIG. 2) is juxtaposed with the detector 140 and the standardization procedure can be automatically carried out. The glass disks 143, whose thickness determines the norm for the bridge circuit (described below) is removably mounted in the frame 143a and can be withdrawn therefrom e.g. out of the paper in FIG. 2. As soon as the turntable 104 has carried the respective article 102 into the position indicated at VIII (FIG. 1), the next measuring cycle begins. In the system indicated, four measuring heads are effective in carrying out a measuring operation whereas the other four heads are undergoing standardization or have completed the measuring cycle.

Figure 3:
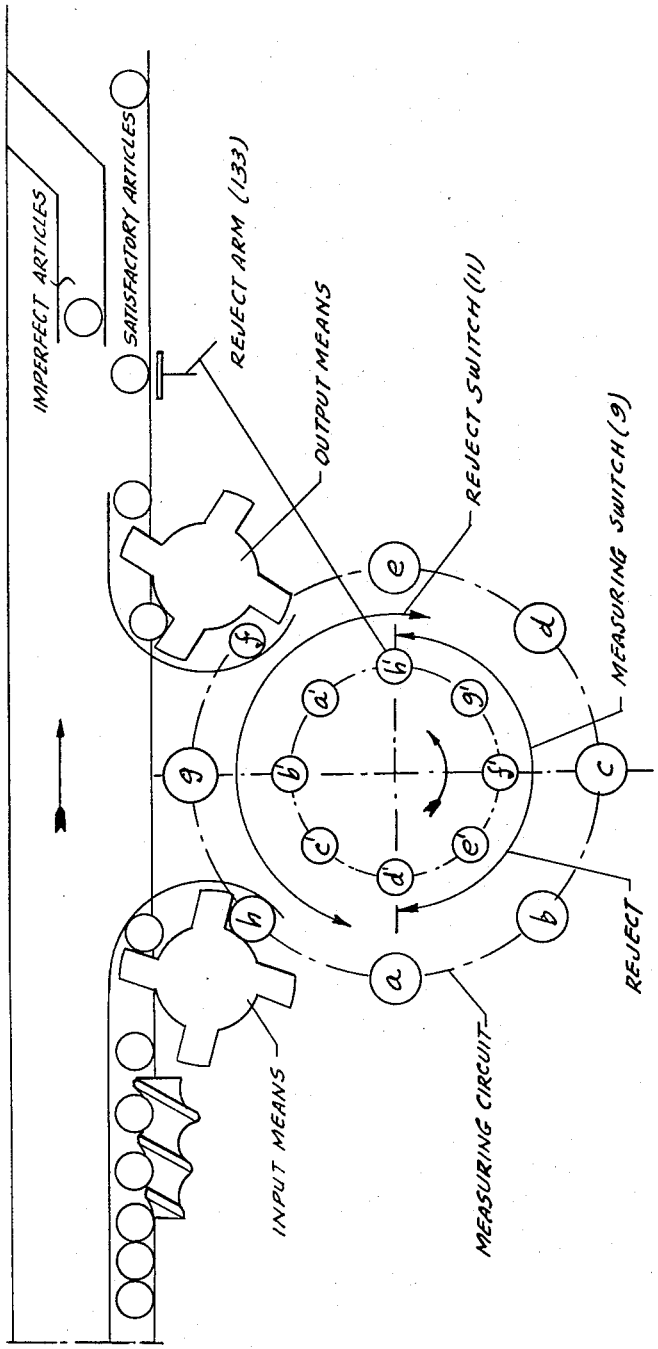
FIG. 3 is a diagrammatic plan view of the apparatus showing the relationship between the various testing stations and the respective locations of the turntable in explanation of the method of the invention.

In FIG. 3, we show diagrammatically the operating modes of the sorting and measuring apparatus and the measuring apparatus and the measuring heads are here designated at *a–h* in accordance with their corresponding stations on the turntable. The ejectors 129 with their respective solenoids 12 (FIG. 5) are angularly offset from the measuring stations by an angle of approximately 135° corresponding to five positions and thus five articles 120 in the process of removal and replacement on the transport path prior to operation of the eject mechanism. The locations of the ejectors 129 associate with respective stations *a–h* and designated at *a'–h'*. With the apparatus in the position illustrated in FIG. 3, the measuring head at station *e* has just terminated its measuring operation and, in the event of an imperfection in the article at the station, the solenoid at *e'* will trip the reject slide after about ⅜ of a further rotation of the turntable, i.e., when this station *e* is located at position VIII (FIG. 1). The article formerly disposed at the station *e* will be engageable by the reject mechanism for shifting into the transport path 107 for the rejected articles.

Cam operation

Figure 4:
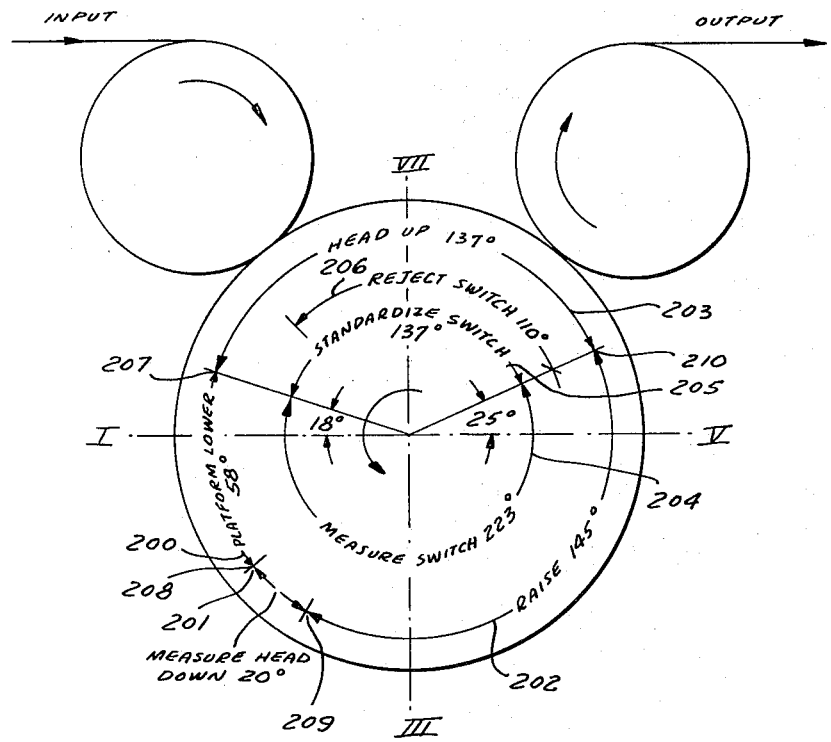
FIG. 4 is a cam diagram of the turntable indicating the approximate durations of the various stages.

In FIG. 4, we show the angular relationships of the several cams and control switches. As will be apparent, the cam 124 permits the article as it moves to a position about 18° in advance of position I to commence the rolling operation over an angular movement of the table 104 through about 58° (arc 200). Thereafter, the cam 142 causes the measuring head to lower rapidly over this arc 200 until it is in its lower position over arc 201 of about 20° for the scanning of the bottom of the article. Then the measuring cycle continues with a gradual elevation of the measuring head which rises (arc 202) over an angular extent of about 145°, i.e., to a point about 25° in advance of the position V. The head is held in its upper position (arc 203) through an angle of about 137°. As the platforms 121 begin to roll to initiate the measuring operation, the respective measuring switch 9 is closed through an arc of about 223° (indicated at 204) whereupon the standardization switch is closed (arc 205). It has been found advantageous to close the standardization switch after an angular interval sufficient to permit the respective detector 140 to span the gap between the upper lip of the article 102 and the standardization disk 143 as will be apparent hereinafter. The rejection switch 11 is energized through an arm of 110° (designated at 206) only after the measuring cycle has terminated.

The control circuit (general)

Figure 5B:
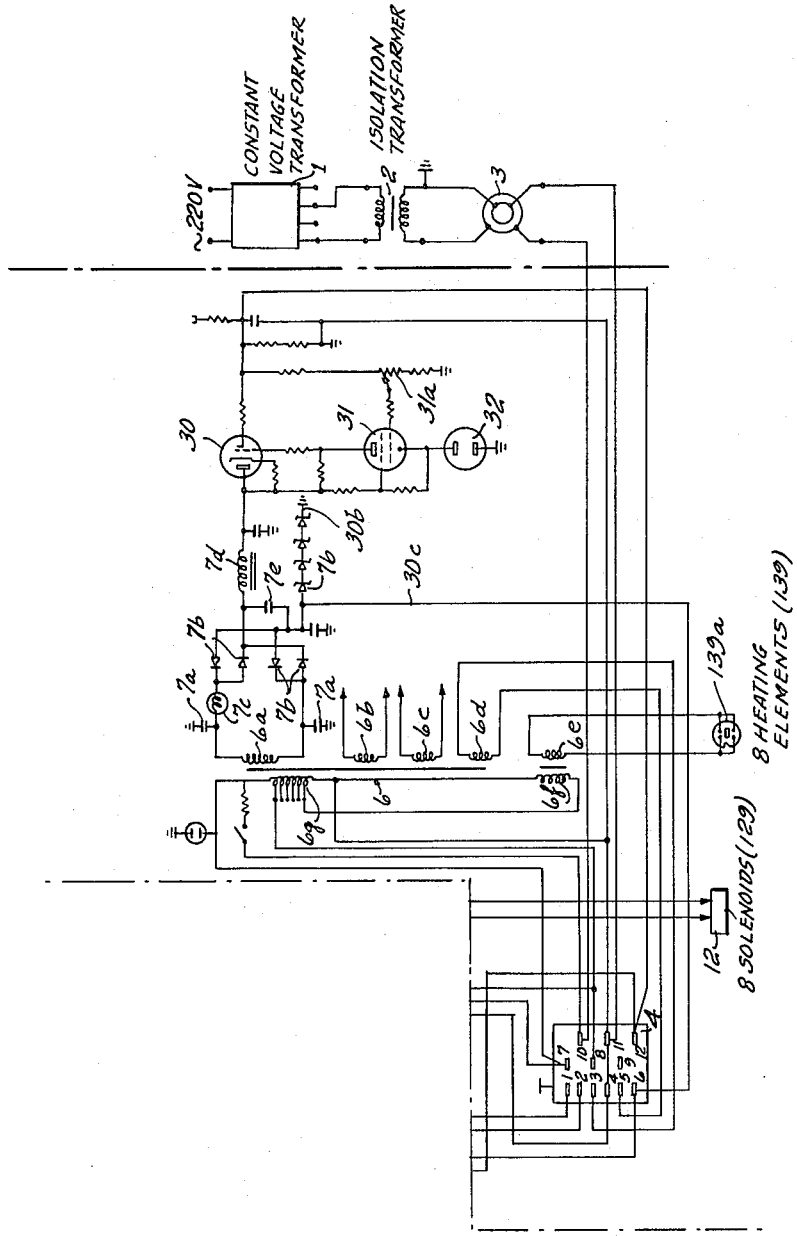

In FIG. 5, we show a control circuit for the apparatus previously described and comprising essentially a source of electric current, a rectifying network and the direct-current stabilization system for the amplifiers of the detection and measuring means, the detection and measuring device with its associated amplifier system connected in a branch circuit having control means for standardization of the measuring network, and a switching means controlled by the bridge and operable at a predetermined position of the turntable for operating the reject mechanism to dispatch a glass article, below the standards of the apparatus, along a transport path other than that along which the satisfactory articles are passed.

More specifically, the control circuit comprises a constant-voltage transformer or other constant-voltage device 1 energized by a source of alternating current, e.g. of about 220 volts, and supplying an isolation transformer 2 whose secondary winding has a grounded side and a "hot" side and is connected to the respective slip rings 3 of the apparatus for delivering a stabilized alternating current to the electronic equipment; the latter, as previously described, is stored in the housing 148 and/or the post 125a of the machine. To permit rapid connection of the electronic apparatus and its removal from the housing portions for repair or examination, we provide a plug-and-jack connection 4 by means of which the alternating supply current is delivered to the various electronic devices, to be described in greater detail hereinafter, and a further plug-and-jack connection 5 by means of which the eight individual measuring bridges and measuring heads are connected with limit-value switches and their reject solenoids. The alternating supply current is delivered to a power transformer 6 whose step-up secondary winding 6a is connected to a full-wave rectifier network generally designated 7 and provided with D-C blocking condensers 7a connected to ground the rectifying diodes 7b, a pilot lamp 7c, a filter network comprised of a choke 7d and filter condensers 7e, and a chain of Zener diodes 7f forming a clipping network for the output full-wave rectifier voltage of the rectifier means 7. The secondary winding 6a of the transformer 6 is designed to deliver approximately 350 volts A-C to the rectifier means. From the latter, the positive potential is applied to the plate of a control tube (triode) 30, designed to stabilize the anode voltages of the thyratron and amplifier networks to be described in greater detail hereinafter. The control tube 30 has its grid in circuit with the usual regulator tube 31 which is, in turn, adjustable by a potentiometer 31a and is tied to a voltage-regulator breakdown tube 32 to establish the regulated voltage to be delivered at the high-voltage positive bus bar 30a. The negative terminal is connected to ground at 30b through the chain of Zener diodes 7f, while the negative bus bar is designated 30c. Further secondary windings 6b and 6c of transformer 6 deliver the necessary heater current to the tubes 31 and 30 of the voltage-regulator system whereas a further secondary winding 6d supplies the heaters of the bridge amplifiers to be described in greater detail hereinafter. Another secondary winding 6e of the power transformer, preferably co-operating with the primary winding 6f, delivers the required voltage and current (e.g. about 5 volts A-C at 40 amperes) to the eight heating elements constituting the radiation sources 139 associated with the measuring heads. These heating elements are represented at 139a in FIG. 5. The primary winding 6g of transformer 6 is provided with a multiplicity of taps whereby the potential of the eight heating rods 139a can be set with exceptional precision.

Measuring Bridges

Each of the radiation measuring heads 140 comprises a radiation-responsive device 8, here shown as an electrically shielded thermistor connected in a bridge circuit whose resistance arms are identical to those of the other bridge networks. Upon irradiation of the thermistors 8 through the glass standardizing samples 143 or through the article 102 being examined, the resistance of the detection device is varied in accordance with the glass thickness and the presence of faults in the glass whereby the bridge networks are capable of performing a sorting operation in response to this variation of the thicknesses. While only one bridge network is illustrated in FIG. 5, it will be understood that eight such networks are provided in the apparatus, each being associated with a respective measuring head 140 and being connected to the current source via the plug-and-jack connection 5. Each of the switches has only two switching conditions which can be compared with one another, namely the "standardization" condition and the "measuring" condition. In the "standardization" condition, the bridge is balanced with the measuring head 140 receiving the radiation through the standardization specimen 143 in the standardization position of the head so that any unbalance upon scanning of the article 102 by the head will trigger the reject mechanism 129 etc. During the measuring condition, the heads 140 with their respective detectors 8 scan the article and respond to thin or thick regions thereof as the article rotates, relative to the predetermined thickness established by the standardization specimens. In practice, it has been found to be possible to trigger the reject mechanism with differences from the predetermined thickness of as little as one tenth of a millimeter. Each of the detectors 8, here shown as thermistors although photocells, radioactivity-responsive devices and the like can also be employed, is connected via the electrically shielded lines 8a and 8b to a "magic" eye 23 providing a visual indication of the bridge balance and to the fine-adjustment potentiometer 13 in series with the fixed resistances 14 of the bridge whose diagonal includes an amplifier transistor 16 and which is provided with a balancing network 33–35 controlled by a servomotor M. The output of the bridge is communicated to the left-hand stage of the double triode 24 whose output is in turn communicated to the right-hand stage of this tube. A thyratron breakdown device 37 responds to an unbalanced condition of the bridge beyond the threshold values and remains energized until the apparatus is placed in the reject position of the turntable for the respective measuring station. A switch 11, which is closed only in the "reject" position of the respective platform and corresponds to the respective switch 145, can then be closed to permit the conductive thyratron to operate the respective solenoid 12 of the ejector 129 associated with that platform. In the event balance of the bridge remains within the preset tolerance, the thyratron 37 will remain unconductive and closure of switch 11 will have no effect upon the reject mechanism and the article 102 on the associated platform will be passed by the discharge mechanism onto the conveyor belt 108. Similarly, the "measuring" stage of the circuit is established by a switch 9 also corresponding to one of the switches shown at 145 for each station while the standardization or balancing procedure is effected by closure of a switch 10. To this end, a relay 20 is operated by the switches 9, 10 and trips the contact 21 of this relay to connect the amplifier 16 with the servomotor M in the standardization position or with the amplifier 24 in the measuring position. The servomotor M, in turn, controls the potentiometer 35 which balances the bridge. The cam-operated switches 9 and 10, in turn, are energized only when the measuring head is scanning the article 102 and when the measuring head is confronted with the standardization sample, respectively. The amplifier tube 24, the thyratron 37 and the "magic" eye are, of course, provided with the associated bias resistors as well as the capacitors normally associated therewith, such components being conventional in the art and of no concern in the present discussion.

The various phases of operation of the control circuit will now be described in greater detail. The direct-current supply for the bridge comprises a full-wave rectifier 25 whose output of 30 volts (approximately) can be applied across the resistance networks 33, 35, 24, the bridge 25 being in turn energized by a transformer 25a connected to the A-C source constituted by constant-voltage transformer 1, the isolation transformer 2 and the slip rings 3.

The radiation detector 8 thus can be considered to be disposed in the left branch of the bridge while the right branch of the latter includes the potentiometer 13 and the fixed-resistance arrangement 14, including a stepping switch for selection of the desired magnitude of the fixed resistance in accordance with the circumstances. We have found it to be highly advantageous if the glass disk 143 for standardization of the instrument is disposed axially above the article 102 with a spacing therefrom and the cams of the switches 9 and 10 are so constructed and arranged that, as the respective measuring assembly 135, 139, 140 is shifted so that the head 140 is aligned with the gap between the lower end of the standardization disk 143 and the upper edge of the article 102 being examined, the switch 10 controlling the standardization is open although the switch 9 controlling the measuring operation is not yet closed. Closure of switch 9 is thus effected only after the measuring head 140 with the respective detector 8 has begun to scan the respective article 102. The bridge ratio is controlled by the series combination of resistances 33 and 34, which have values of, for example, 10,000 ohms each, and the intervening potentiometer 35 whose resistance value may be 1000 ohms. The wiper of potentiometer 35 is coupled mechanically with the servomotor M and, as in conventional servomotor-potentiometer systems, this motor is operated only until the wiper reaches a position corresponding to balance of the bridge or the "null" position thereof. In the balancing or "null" branch of the bridge, a feedback-couple D-C amplifier 36 is provided. This amplifier 36 has the dual function of providing in the "standardization" condition of the circuit to drive voltage or error signal for the servomoter M until the "null" position is achieved, and in the "measuring" condition to serve as the source of threshold voltage for the grid of the thyratron 37 in conjunction with the further amplifier tube 24 thereby serving to trigger the thyratron 37 when the bridge senses a wall-thickness differential beyond a predetermined level. The setting of the threshold output of the D-C amplifier 36 is accomplished with the aid of a stepping switch 15 designed to connect resistances 15a, 15b etc. to the amplifier via a fine-adjustment potentiometer 15c in accordance with the desired operating conditions. As previously indicated, the amplifier 36 is connected in a feedback relationship with the thyratron 37 to form a quenching system for the amplifier 16 during the standardization operation of the servomotor M and thus prevents hunting of the servomotor and the oscillations which otherwise would develop during the standardization by servomotor-potentiometer systems. For this purpose, a parallel R-C network 17 is also connected to the emitter of the transistor amplifier 16.

The potentiometer 18 serves to adjust the amplification of the dual-triode amplifier tube 24 and thus functions also as a fine adjustment for the threshold of the thyratron 37. We have also found it to be desirable to provide a switch 19 in plate circuit of the amplifier 24 to interrupt the self-locking of the threshold voltage and to thereby permit a simpler testing of the operation of the circuits. A reversing switch 22 is also provided for interchanging the function of the switches 9 and 10 and thus the "measuring" and "standardization" conditions so that the circuitry and its operation can be tested more readily. The magic eye 23, which affords an indication of the state of the bridge at a glance, has its right-hand grid connected to ground and thus at a constant potential while the left-hand grid is connected to the bridge at the junction of the detector 8 therewith to provide a direct indication of any bridge unbalance.

Because of the repeated standardization procedure in conjunction with the rapid operation of the servomotor-potentiometer standardization, the rapid interchange between "measuring" and "standardization" conditions affords an accuracy of measurement unparalleled heretofore. It has been found that such standardization eliminates the effect of temperature and even transients in the current supply, while permitting use of amplifiers whose stability is substantially less than that required heretofore in thickness-measuring devices. The limiting frequency of the direct-current amplifier for establishing the threshold level is above 1000 cycles/sec., thereby rendering the sorting apparatus sensitive to wall-thickness differences of limited extent in the glass particle when the latter is rotated rapidly on its platform. Thus, the apparatus effects exact sorting of articles with extremely thin wall thickness and, because of the balancing of the bridge with a sample disposed in the path of the measuring head, the apparatus can be set to respond to predetermined glass thicknesses merely by emplacement of the standardization disk. As has been indicated earlier the sensing of a wall thickness different from that of the specimen beyond a predetermined tolerance as determined by the adjustment of the potentiometer 18 and the output of amplifier 36, will trigger the thyratron 37 which may in a conductive state trying the balance of the measuring cycle and until the turntable 104 has cause the respective switch 11 to close. The thyratron 37 thus completes a circuit to the respective solenoid 12 of the reject device 129 etc. to operate the lever 133 when the respective article 102 is in position at the discharge wheel to shift the unsatisfactory article 106 onto the transport path 107 along with the rejected articles pass for further handling. It will be evident that, with the use of other threshold devices and circuitry, the apparatus can be provided to respond to transients in the measured value indicative of crevices or air bubbles and like faults in the glass or to non-uniformity of the mouth of the article.

*Operation*

The operation of the mechanism will now be described with reference to the examination of two articles, one of which is defective and the other is within the predetermined range of tolerances. A non-defective article is carried along the transport path 100 and is given the required spacing from the proceeding article 102 by a worm 101 which feeds the article then to the cruciform star wheel 103 of the input means. The star wheel then emplaces the article at the location VIII (FIG. 1) so that it occupies the station *h* of FIG. 3 on the continuously operable platform 104. The suction applied to the bottom of the article retains it against movement as it passes beyond the location VIII to the point 207 at which its platform 121' lowers to form the respetcive pocket for the article which then proceeds through the locations I–V. At point 208, the respective measuring slide is lowered in its bottom position so that the heating rod is disposed in the interior of the article 102, the switch 9 having been closed as indicated in FIG. 5 at point 207. The pulley 122 of the station *h* comes into engagement with the belt 119 at approximately the station I and the article is set into rapid rotation so that the measuring operation is commenced as soon as the head is lowered into the bottle, a complete scanning being carried out while the head is in its lower position over arc 201 from point 208 to a point 209 at which the slide begins to raise slowly. Since the article is free of defects, the unbalance of the bridge will, if any, be insignificant and the threshold of thyratron 37 will not be attained. The thyratron will thus remain non-conductive and closure of switch 11 when the turntable reaches the position 210 will not cause any energiaztion of the respective solenoid 12, 129, then located approximately at position III in accordance with the diagram of FIG. 3. The article 102 is then removed by the output means 105 etc. and proceeds along the path 108 beyond the reject device 133 since the latter is unactuated. During further rotation of the turntable, the slide, and measuring head of station h is elevated to the standardization position in which switch 10 closes to permit the servomotor M to adjust the potentiometer 35 to bring the bridge back to its "null" condition. When, however, a defective article is examined, the thyratron 37 is triggered during the measuring cycle as soon as a thin spot in the glass is detected. The thyratron 37 remains conductive until switch 11 closes to trigger the respective solenoid 12, 129 which, as it engages the bar 130, causes the lever 133 to shift the article corresponding to that electromagnet onto the reject path 107.

The invention described an illustrated is believed to admit of many modifications within the ability of persons skilled in the art, all such modifications being considered within the spirit and scope of the appended claims.

We claim:

1. A method of continuously measuring the wall thickness of a succession of glass articles, comprising the steps of displacing said succession of articles continuously along a transport path; successively diverting said articles from said transport path and conveying them continuously along an arcuate measuring path prior to replacing them on said transport path; individually rotating said articles while displacing them along said arcuate path about respective axes; scanning said articles during the rotation thereof as they are carried along said arcuate path by subjecting them to a beam of radiation and scanning the rotating articles axially with a detector responsive to such radiation to measure same; and thereafter sorting said articles in accordance with the measurement of the raidation thus made by separating articles having a wall thickness beyond a predetermined tolerance as measured by said detector from other articles within said tolerance and directing them along different branches of said transport path.

2. The method defined in claim 1 wherein said articles are transluminated from within by the mal radiation during said rotation.

3. An apparatus for the continuous examination of a succession of hollow-glass articles with upright axes, comprising continuously operable conveyor means forming a transport path for said succession of articles; a turntable rotatable about a vertical axis and disposed along said path, said turntable being provided with a plurality of angularly spaced measuring stations; input means for successively feeding articles from said path onto successive stations of said turntable; output means downstream of said input means for successively removing articles from said stations of said turntable; a respective platform disposed at each of said stations of said turntable and rotatable about a respective vertical axis for independent rotary entrainment of said articles at said stations, measuring means at each of said stations including a source of radiation directed at the respective article and detector means responsive to said radiation and axially scanning the respective article during the rotation thereof upon the respective platform and the rotary movement of said turntable for evaluating the article, each of said platforms being vertically shiftable on said turntable; and first cam means for lowering said platform upon movement of the respective stations away from said input means during rotation of said turntable to form a cup for retaining the respective article, said measuring means including a vertically displaceable radiation source axially insertable into the respective article, said detector being shiftable jointly with said source externally of the article for scanning same.

4. An apparatus as defined in claim 3 wherein said measuring means includes a plurality of upright columns mounted on said turntable and each assigned to one of said stations, a respective slide vertically guided on the respective column and carrying the respective source and indicator, and second cam means co-operating with said slide upon rotation of said turntable for raising and lowering said slides.

5. An apparatus as defined in claim 4 wherein said slides are of inverted-U configuration with one arm extending axially carrying said detector, said source including heating means for generating thermal radiation, said detector being temperature sensitive.

6. An apparatus as defined in claim 3 wherein said input means includes a spacing worm for imparting a predetermined separation to the articles successively moving along said transport path and a star wheel downstream of said worm for successively transferring said articles to said stations, said output means including a further star wheel for transferring said articles from said stations to said transport path, said apparatus further comprising common drive means for said turntable, said star wheels and said worm for the synchronous operation thereof, and a drive mechanism for rotating said platforms, said mechanism including respective pulleys carried by said platforms below said turntable and a driven belt successively engageable with said pulleys during rotation of said turntable over an arc of movement of said turntable corresponding substantially to the measuring duration of said detectors.

7. An apparatus as defined in claim 3, further comprising sorting means downstream of said output means for separating refective articles from nondefective articles in accordance with the radiation measurement of the respective detector, said sorting means including an electromagnetically operable ejector assigned to each of said stations and carried by said turntable, and mechanism engageable by said ejector means in a predetermined location along the path of said turntable upon energization of the ejector means to sort a defective article from the nondefective articles, said apparatus further comprising circuit means for controlling said ejectors.

8. An apparatus for the continuous examination of a succession of hollow-glass articles with upright axes, comprising continuously operable conveyor means forming a transport path for said succession of articles; a turntable rotatable about vertical axis and disposed along said path, said turntable being provided with a plurality of angularly spaced measuring stations; input means for successively feeding articles from said path onto successive stations of said turntable; output means downstream of said input means for successively removing articles from said station of said turntable; a respective platform disposed at each of said stations of said turntable and rotatable about a respective vertical axis for independent rotary entrainment of said articles at said stations; and measuring means at each of said stations including a source of radiation directed at the respective article and detector means responsive to said radiation and axially scanning the respective article during the rotation thereof upon the respective platform and the rotary movement of said turntable for evaluating the article, each of said platforms being formed with openings at the bottom of the respective article, said turntable having a tubular shaft connectable with a reduced-pressure source, a suction distributor carried by said shaft and flexible tubes connecting said distributor with said platforms and communicating with the openings thereof for applying suction at the bottom of said articles to retain them upon the respective platforms.

9. An apparatus for the continuous examination of a succession of hollow-glass articles with upright axes, comprising continuously operable conveyor means forming a transport path for said succession of articles; a turntable rotatable about a vertical axis and disposed along said path, said turntable being provided with a plurality of angularly spaced measuring stations; input means for successively feeding articles from said path onto successive stations of said turntable; output means downstream of said input means for successively removing articles from said station of said turntable; a respective platform disposed at each of said stations of said turntable and rotatable about a respective vertical axis for independent rotary entrainment of said articles at said stations; measuring means at each of said stations including a source of radiation directed at the respective article and detector means responsive to said radiation and axially scanning the respective article during the rotation thereof upon the respective platform and the rotary movement of said turntable for evaluating the article; sorting means downstream of said output means for separating defective articles from nondefective articles in accordance with the radiation measurement of the respective detector means, said sorting means including an electromagnetically operable ejector means assigned to each of said stations and carried by said turntable, and mechanism engageable by said ejector means in a predetermined location along the path of said turntable upon energization of the ejector means to sort a defective article from the nondefective articles; circuit means for controlling said ejector means; and standardizing means at each of said stations including means for removably supporting a glass standardization specimen in the path of radiation emitted from said source toward said detector of the respective station in a position of said measuring means withdrawn from the respective article, said circuit means including a respective bridge assigned to each of said stations and including the respective detector, and means for balancing said bridge in a standardization position of the measuring means with the respective source irradiating the respective detector through the associated said specimen.

10. An apparatus as defined in claim 9 wherein said circuit means further comprises an amplifier assigned to each of said stations and connected with the respective bridge for generating one output in accordance with an imbalance thereof, electronic-switch means having a triggering threshold and energizable by said amplifier, the respective electromagnetic ejector means being connectable in circuit with said electronic switch means of the respective station, and a respective cam-operated reject switch connected between the respective electronic switch means and ejector means for operating the ejector means in a conductive state of the electronic switch means upon rotation of said turntable at the conclusion of a measuring operation of the respective station.

11. An apparatus as defined in claim 10 wherein said circuit means includes a constant-voltage device connectable to a source of alternating current, an isolation transformer energizable by said constant-voltage device and having a secondary winding with a ground side and a hot side, slip rings connected with said sides of said isolation transformer for delivering a stabilized alternating current to said turntable, said turntable forming a housing for said amplifiers and said electronic switch means of the respective stations, a regulated direct-current power supply energized from said slip rings for supplying a regulated voltage to said amplifiers and said switch means, said bridges each including at least one balancing branch containing a potentiometer, balancing means including a servomotor coupled with said potentiometer and a direct-current amplifier connectable with the respective servomotor and with the respective electronic switch means for operating said servomotor upon an imbalance of said bridge in the standardizing position of said measuring means and for generating the threshold potential of said electronic switch means when said measuring means scans the respective article, and a respective magic eye connected with each bridge for indicating the state of imbalance thereof.

12. A method of operating an apparatus for the continuous examination of a succession of hollow glass articles with upright axes, said apparatus including continuously operable conveyor means forming a transport path for a succession of articles and a continuously rotatable turntable disposed along said path, said method comprising the steps of successively transferring said articles from said transport path onto spaced-apart locations of said turntable, lowering said articles during an initial arc of rotation of said turntable after the mounting of the articles thereon while applying suction to the base of each article, thereby receiving the article in cups of the turntable; rotating each of said articles about its axis in its cup while rapidly inserting into each article a heating rod and scanning the exterior of the article to measure the thermal intensity transmitted through the article; maintaining the scanning of the article along its base for a period corresponding at least to one complete rotation of the article about its axis and then axially scanning the rotating article progressively and slowly upwardly; triggering an electronic switching device upon the detection of a transmission of thermal radiation through the respective article above a predetermined tolerance; connecting said switching device in a predetermined angular position of said turntable across an ejector for separating defective articles from satisfactory articles; and replacing said articles upon said transport path after elevating them on said turntable.

References Cited

UNITED STATES PATENTS

| 2,755,703 | 7/1956 | Politsch et al. | 250—223 |
| 2,915,638 | 12/1959 | Poole | 250—83.3 X |
| 3,328,593 | 6/1967 | Johnson et al. | 250—223 |
| 3,348,049 | 10/1967 | Stacey | 209—111.5 X |
| 3,356,212 | 12/1967 | Landin | 250—223 |
| 2,643,767 | 6/1953 | Baker | 209—111.7 |
| 2,735,017 | 2/1956 | Beard at al. | 209—111.7 |
| 3,150,266 | 9/1964 | Mathias | 209—111.7 |
| 3,159,279 | 12/1964 | Sloan et al. | 209—111.5 |
| 3,245,529 | 4/1966 | Doud | 209—111.5 X |
| 3,307,446 | 3/1967 | Rottmann. | |

FOREIGN PATENTS

| 124,670 | 9/1959 | U.S.S.R. |

ALLEN N. KNOWLES, *Primary Examiner.*